(12) United States Patent
Dillon et al.

(10) Patent No.: US 6,277,919 B1
(45) Date of Patent: Aug. 21, 2001

(54) POLYMER PROCESSING ADDITIVE CONTAINING A MULTIMODAL FLUOROPOLYMER AND MELT PROCESSABLE THERMOPLASTIC POLYMER COMPOSITION EMPLOYING THE SAME

(75) Inventors: Maria P. Dillon, St. Paul; Susan S. Woods, Shoreview; Kirsten J. Fronek, Woodbury, all of MN (US); Claude Lavallée, London (CA); Stephen E. Amos; Karl-Dieter Weilandt, both of Minneapolis, MN (US); Harald Kaspar; Bernhard Hirsch, both of Burgkirchen (DE); Klaus Hintzer; Peter J. Scott, both of Woodbury, MN (US)

(73) Assignee: Dyneon LLC, Oakdale, MN (US)

( * ) Notice: Subject to any disclaimer, the term of this patent is extended or adjusted under 35 U.S.C. 154(b) by 0 days.

(21) Appl. No.: 09/311,107

(22) Filed: May 13, 1999

(51) Int. Cl.⁷ ............................ C08L 27/12; C08L 27/14; C08L 27/16; C08L 27/18; C08L 27/20
(52) U.S. Cl. .......................... 525/199; 525/239; 525/240
(58) Field of Search .................... 525/199, 239, 525/240

(56) References Cited

U.S. PATENT DOCUMENTS

| | | |
|---|---|---|
| 3,125,547 | 3/1964 | Blatz ............................ 260/45.5 |
| 4,262,101 | 4/1981 | Hartwimmer et al. ............... 526/89 |
| 4,558,141 | 12/1985 | Squire ............................ 549/455 |
| 4,855,013 | 8/1989 | Ohta et al. ...................... 156/601 |
| 4,904,735 | 2/1990 | Chapman et al. ................ 525/199 |
| 5,010,130 | 4/1991 | Chapman, Jr. et al. ............ 524/445 |
| 5,015,693 | 5/1991 | Duchesne et al. ................ 525/187 |
| 5,064,594 | 11/1991 | Priester et al. .................. 264/127 |
| 5,132,368 | 7/1992 | Chapman et al. ................. 525/165 |
| 5,284,184 | 2/1994 | Noone et al. .................... 138/121 |
| 5,350,817 | * 9/1994 | Winter .......................... 526/119 |
| 5,397,897 | 3/1995 | Komatsu et al. ................ 250/338.4 |
| 5,464,904 | 11/1995 | Chapman et al. ................. 525/200 |
| 5,710,217 | 1/1998 | Blong et al. ..................... 525/199 |
| 5,718,974 | * 2/1998 | Kmiec ............................ 428/383 |
| 5,830,947 | 11/1998 | Blong et al. ..................... 525/187 |

FOREIGN PATENT DOCUMENTS

| | | |
|---|---|---|
| 0 924 257 A1 | 6/1999 | (EP) . |
| WO 99/41313 | 8/1999 | (WO) . |

OTHER PUBLICATIONS

A. Rudin et al., "Fluorocarbon Elastomer Aids Polyolefin Extrusion", *Plastics Engineering*, Mar. 1986, pp. 63–66.

Rauwendaal, C., "Polymer Extrusion", Hanser Publishers, p. 23–48, 1986.

R. F. Westover, "Melt Extrusion", Encyclopedia of Polymer Science and Technology, vol. 8, pp. 573–581 (John Wiley & Sons, 1968).

* cited by examiner

*Primary Examiner*—Fred Zitomer
(74) *Attorney, Agent, or Firm*—James V. Lilly; Dean M. Harts (57) ABSTRACT

A polymer processing aid composition, a melt processable polymer composition that uses the polymer processing aid, and a method of improving the melt processability of a thermoplastic polymer are provided. The polymer processing aid composition comprises a multimodal fluoropolymer that preferably comprises interpolymerized units derived from an ethylenically unsaturated fluoromonomer tetrafluoroethylene and at least one ethylenically copolymerizable alpha-olefin monomer.

24 Claims, 1 Drawing Sheet

Fig. 1

POLYMER PROCESSING ADDITIVE CONTAINING A MULTIMODAL FLUOROPOLYMER AND MELT PROCESSABLE THERMOPLASTIC POLYMER COMPOSITION EMPLOYING THE SAME

FIELD OF THE INVENTION

This invention relates to a polymer processing additive that employs a multimodal fluoropolymer; to a melt processable thermoplastic polymer composition that utilizes this polymer processing additive; and to a method of improving the melt processability of a melt processable thermoplastic polymer.

BACKGROUND

For any melt processable thermoplastic polymer composition, there exists a critical shear rate above which the surface of the extrudate becomes rough and below which the extrudate will be smooth. See, for example, R. F. Westover, *Melt Extrusion*, Encyclopedia of Polymer Science and Technology, Vol. 8, pp 573–81 (John Wiley & Sons 1968). The desire for a smooth extrudate surface competes, and must be optimized with respect to, the economic advantages of extruding a polymer composition at the fastest possible speed (i.e. at high shear rates).

Some of the various types of extrudate roughness and distortion observed in high and low density polyethylenes are described by A. Rudin, et al., *Fluorocarbon Elastomer Aids Polyolefin Extrusion*, Plastics Engineering, Mar. 1986, at 63–66. The authors state that for a given set of processing conditions and die geometry, a critical shear stress exists above which polyolefins such as linear low-density polyethylene (LLDPE), high-density polyethylene (HDPE), and polypropylene suffer melt defects. At low shear rates, defects may take the form of "sharkskin", a loss of surface gloss, that in more serious manifestations appears as ridges running more or less transverse to the extrusion direction. At higher rates, the extrudate can undergo "continuous melt fracture" becoming grossly distorted. At rates lower than those at which continuous melt fracture is first observed, LLDPE and HDPE can also suffer from "cyclic melt fracture", in which the extrudate surface varies from smooth to rough. The authors state further that lowering the shear stress by adjusting the processing conditions or changing the die configuration can avoid these defects to a limited extent, but not without creating an entirely new set of problems. For example, extrusion at a higher temperature can result in weaker bubble walls in tubular film extrusion, and a wider die gap can affect film orientation.

There are other problems often encountered during the extrusion of thermoplastic polymers. They include a build up of the polymer at the orifice of the die (known as die build up or die drool), increase in back pressure during extrusion runs, and excessive degradation or low melt strength of the polymer due to high extrusion temperatures. These problems slow the extrusion process either because the process must be stopped to clean the equipment or because the process must be run at a lower speed.

Certain fluorocarbon processing aids are known to partially alleviate melt defects in extrudable thermoplastic hydrocarbon polymers and allow for faster, more efficient extrusion. U.S. Pat. No. 3,125,547 to Blatz, for example, first described the use of fluorocarbon polymer process aids with melt-extrudable hydrocarbon polymers wherein the fluorinated polymers are homopolymers and copolymers of fluorinated olefins having an atomic fluorine to carbon ratio of at least 1:2 and wherein the fluorocarbon polymers have melt flow characteristics similar to that of the hydrocarbon polymers.

U.S. Pat. No. 4,904,735 (Chapman, Jr. et al.) describes a fluorinated processing aid for use with a difficultly melt-processable polymer comprising (1) a fluorocarbon copolymer which at the melt-processing temperature of the difficultly melt-processable polymer is either in a melted form if crystalline, or is above its glass transition temperature if amorphous, and (2) at least one tetrafluoroethylene homopolymer or copolymer of tetrafluoroethylene and at least one monomer copolymerizable therewith wherein the mole ratio is at least 1:1, and which is solid at the melt-processable temperature of the difficultly melt-processable polymer.

U.S. Pat. No. 5,397,897 to Morgan et al. Describes the use of copolymers of tetrafluoroethylene and hexafluoropropylene having high hexafluoropropylene content as processing aids in polyolefins.

U.S. Pat. Nos. 5,064,594 to Priester et al., and U.S. Pat. No. 5,132,368 to Chapman, Jr. et al. describe the use of certain fluoropolymer process aids containing functional polymer chain end groups including —COF, —SO$_2$F, —SO$_2$Cl, SO$_3$M, —OSO$_3$M, and —COOM, wherein M is hydrogen, a metal cation, or a quaternary ammonium cation for use with a difficultly melt-processable polymer.

U.S. Pat. No. 5,464,904 to Chapman et al. discloses the use of unimodal semicrystalline fluoroplastics such as copolymers of tetrafluoroethylene and hexafluoropropylene and terpolymers of tetrafluoroethylene, hexafluoropropylene and vinylidene fluoride with a polyolefin. The only enhancement of melt-processability described in this patent is shown in Example 25 where a concentration of 1000 ppm of the fluoropolymer in linear low density polyethylene is said to reduce the extrusion pressure of the extrudable composition. There is no showing of a reduction in melt defects.

U.S. Pat. Nos. 5,015,693 and 4,855,013 to Duchesne and Johnson disclose the use of a combination of a poly (oxyalkylene) polymer and a fluorocarbon polymer as a processing additive for thermoplastic hydrocarbon polymers. The poly(oxyalkylene) polymer and the fluorocarbon polymer are used at such relative concentrations and proportions as to reduce the occurrence of melt defects during extrusion. Generally the concentration of the fluoropolymer is present at a level of from 0.005 to 0.2 weight percent of the final extrudate and the poly(oxyalkylene) polymer is present at a level of from 0.01 to 0.8 weight percent of the final extrudate. Preferably, the weight of the fluorocarbon polymer in the extrudate and the weight of the poly (oxyalkylene) polymer in the extrudate are in a ratio of 1:1 to 1:10.

U.S. Pat. No. 5,710,217 to Blong at al. Discloses an extrudable thermoplastic hydrocarbon composition that comprises an admixture of a melt processable hydrocarbon polymer as the major component and an effective amount of a chemically-resistant fluoropolymer process aid. The fluoropolymer contains at least 50% by weight of fluorine and comprises one or more fluoropolymers that are essentially completely ethylenically unsaturated.

SUMMARY

It has been discovered that a multimodal fluoropolymer is surprisingly effective in reducing melt defects such as sharkskin in thermoplastic polymers, or in postponing these defects to higher extrusion rates than can be typically achieved without the use of such a multimodal fluoropolymer, even when the melt flow index of the multimodal fluoropolymer as a whole is the same as the melt flow index of a unimodal fluoropolymer. Additionally, it has been discovered that multimodal fluoropolymers are also surprisingly effective in reducing the occurrence of die build up, reducing the amount of back pressure during extrusion of non-hydrocarbon polymers, and permitting the use of lower extrusion temperatures to achieve an equivalent throughput.

Briefly, in one aspect, the present invention provides a polymer processing additive composition based on a multimodal fluoropolymer. As used herein, the term multimodal means that the fluoropolymer has at least two components of discrete and different molecular weights. The first, or low molecular weight component (referred to hereinafter as Component A) has a relatively high melt flow index ($MFI_A$). The second, or high molecular weight component (referred to hereinafter as Component B) has a relatively low $MFI_B$. Preferably the multimodal fluoropolymer contains no more than two or three of the discrete molecular weight components.

The exact MFI value that defines Component A and Component B is determined by how the multimodal polymer is to be used. For example, if the multimodal polymer is to be used an additive to enhance the processability of a hydrocarbon polymer, $MFI_A$ is preferably greater than 50 while $MFI_B$ is preferably 50 or less, more preferably from 1 to 50. If the multimodal polymer is to be used as an additive for a non-hydrocarbon polymer such as a nylon or a polyester, $MFI_A$ may be greater than 100 while $MFI_B$ may be 100 or less.

The MFI values reported herein are measured at 265° C. using a 5 kg weight according to ASTM D-1238. In some cases (noted below) the MFI is a value calculated to correspond to the MFI at 265° C. and 5 kg. The calculated value was used when the measured MFI of the polymer at 265° C. and 5 kg was either so low or high that it was difficult to measure accurately. The calculated value was determined by first measuring the MFI of several samples of an appropriate molecular weight version of the polymer at 190° C. using a 2.16 kg weight according to ASTM D-1238 and 265° C. using a 5 kg weight according to ASTM D-1238. The MFI of each sample at each condition was determined. The MFI at 265° C. was then divided by the MFI at 190° C. to determine a scaling factor for each sample. The scaling factors were then averaged. The MFI of the test polymer was then measured at 190° C. using a 2.16 kg weight according to ASTM D-1238. This value was then multiplied by the scaling factor to give the calculated value of the test polymer.

The ratio of the MFI of Component A to the MFI of Component B ($MFI_A:MFI_B$) used in the practice of the invention is from 2:1 to 100:1, preferably from 5:1 to 50:1. The weight ratio of the low molecular weight Component A to the high molecular weight Component B (A:B) is preferably from 1:99 to 99:1, more preferably from 5:95 to 50:50. Most preferably the weight ratio of Component A to Component B is in the range of from 10:90 to 45:65.

The composition of the invention may contain three or more components of different molecular weights. However, the ratio $MFI_A:MFI_B$ of at least one Component A to one Component B must be in the range of 2:1 to 100:1.

Even though the multimodal terpolymer used in the invention comprises at least two components of different molecular weight, and hence different MFI values, it possesses an overall MFI value ($MFI_O$). Typically this value is in the range of from 1 to 500, preferably from 5 to 100. Surprisingly the multimodal terpolymer performs more effectively as a processing additive than a comparable unimodal terpolymer of the same or a similar overall MFI value.

In another aspect, the present invention provides a novel melt processable polymer composition that comprises a major amount (i.e., at least 50% by weight) of a melt processable thermoplastic host polymer and a minor, but effective, amount of the processing additive composition based on the multimodal fluoropolymer.

In yet another aspect, the present invention provides a method for reducing melt defects (and thereby improving the melt processability) of the host polymer. In this method the host polymer is mixed with an effective amount of the processing additive composition. The resulting melt processable polymer composition is mixed until there is preferably a uniform distribution of the processing additive composition in the host polymer. The polymer composition is then melt processed.

As used herein, an effective amount of the processing additive composition is that which either (a) reduces the occurrence of melt defects during extrusion of the host polymer below the level of melt defects occurring during the extrusion of a host polymer that does not employ the multimodal fluoropolymer-based processing additive composition of the invention, or (b) delays the onset of the occurrence of such defects to a higher extrusion rate (that is a higher shear rate).

DETAILED DESCRIPTION

The amount of the multimodal fluoropolymer used as a process additive in this invention is typically relatively low. The exact amount used may be varied depending upon whether the melt-processable composition is to be extruded into its final form (e.g., a film) or whether it is to be used as a masterbatch which is to be further diluted with additional host polymer before being extruded into its final form. Generally, the multimodal fluoropolymer comprises from about 0.005 to 50 weight percent of the melt processable polymer composition. If the melt processable polymer composition is a masterbatch, the amount of the multimodal fluoropolymer may vary between about 2 to 50 weight percent of the composition. If the melt processable polymer composition is to be extruded into final form and is not further diluted by the addition of host polymer, it typically contains a lower concentration of the multimodal fluoropolymer, e.g., about 0.005 to 2 weight percent, and preferably about 0.01 and 0.2 weight percent of the melt-processable composition. In any event, the upper concentration of the multimodal fluoropolymer used is generally determined by economic limitations rather than by any adverse physical effect of the concentration of the processing aid.

The multimodal fluoropolymers useful in the invention include both amorphous and partially crystalline (also referred to herein as semi-crystalline) fluoropolymers. Amorphous fluoropolymers usually do not exhibit a melt point. Semi-crystalline fluoropolymers are melt processable per se and have either a melt point or have a glass transition temperature above ambient temperature.

The selection of an amorphous or semicrystalline fluoropolymer for use in the invention is influenced by a number of factors such as the host polymer being used and the processing conditions being employed. In any event, the multimodal fluoropolymers are incompatible with the host polymer yet possess a melt viscosity that permits an easy and efficient incorporation into the host polymer melt.

The multimodal fluoropolymers useful in the invention comprise interpolymerized units derived from at least one fluorinated, ethylenically unsaturated monomer, preferably two or more monomers, of the formula $$RCF=C(R)_2 \qquad (I)$$

wherein R is selected from H, F, Cl, alkyl of from 1 to 8 carbon atoms, aryl of from 1 to 8 carbon atoms, cyclic alkyl of from 1 to 10 carbon atoms, or perfluoroalkyl of from 1 to 8 carbon atoms. The R group preferably contains from 1 to 3 carbon atoms. In this monomer each R group may be the same as each of the other R groups. Alternatively, each R group may be different from one or more of the other R groups.

The multimodal fluoropolymers may also comprise a copolymer derived from the interpolymerization of at least one formula I monomer with at least one nonfluorinated, copolymerizable comonomer having the formula $$(R^1)_2C=C(R^1)_2 \qquad (II)$$

wherein $R^1$ is selected from H, Cl, or an alkyl group of from 1 to 8 carbon atoms, a cyclic alkyl group of from 1 to 10 carbon atoms, or an aryl group of from 1 to 8 carbon atoms. $R^1$ preferably contains from 1 to 3 carbon atoms.

Representative examples of useful fluorinated formula I monomers include, but are not limited to, vinylidene fluoride, tetrafluoroethylene, hexafluoropropylene, chlorotrifluoroethylene, 2-chloropentafluoropropene, dichlorodifluoroethylene, 1,1-dichlorofluoroethylene, and mixtures thereof Perfluoro-1,3-dioxoles may also be used. The perfluoro-1,3-dioxole monomers and their copolymers are described in U.S. Pat. No. 4,558,141 (Squires).

Representative examples of useful formula II monomers include ethylene, propylene, etc.

Especially useful multimodal fluoropolymers include those derived from the interpolymerization of two or more different formula I monomers and one or more formula I monomers with one or more formula II monomers. Examples of such polymers are those derived from interpolymerized units derived from vinylidene fluoride (VDF) and hexafluoropropylene (EFP); and those derived from tetrafluoroethylene (TFE) and at least 5 weight % of at least one copolymerizable comonomer other than TFE. This latter class of fluoropolymers includes polymers of interpolymerized units derived from TFE and HFP; polymers of interpolymerized units derived from TFE, HFP and VDF; polymers of interpolymerized units derived from TFE, HFP and a formula II monomer; and polymers derived from interpolymerized units derived from TFE and a formula II monomer.

A preferred subclass of fluoropolymers useful in the invention are the semicrystalline fluoropolymers, also referred to herein as fluoroplastics. These polymers generally have a peak melting temperature of from 60° to 300° C. The fluoroplastics may be homopolymers or copolymers of a monomer of formula I or copolymers of at least one monomer of formula I with at least one monomer of formula II. Examples of preferred subclasses of fluorothermoplastic polymers useful in the invention include the following:

A. Fluorothermoplastics derived solely from VDF and HFP. Preferably, these fluorothermoplastics have interpolymerized units derived from 99 to 67 weight percent of VDF and from 1 to 33 weight percent HFP, more preferably from 90 to 67 weight percent VDF and from 10 to 33 weight percent HFP.

B. Fluorothermoplastics having interpolymerized units derived solely from (i) TFE, (ii) more than 5 weight percent of one, preferably two, ethylenically unsaturated copolymerizable fluorinated monomers other than TFE having the general structure of formula I. A preferred class of these fluoroplastics is derived from copolymerizing 30 to 70 wt % TFE, 10 to 30 wt %, HFP, and 5 to 50 wt %, preferably 10 to 45 wt % of a third comonomer other than TFE and HFP having the general structure of formula I. A subclass of this preferred class of multimodal fluoropolymer is derived from copolymerization of a monomer charge of TFE (preferably in an amount of 45 to 65 weight %), HFP (preferably in an amount of 10 to 30 weight %), and VDF (preferably in an amount of 15 to 35 weight %). These fluorothermoplastics and their method of preparation are described in copending application U.S. Ser. No. 09/311,111, filed of even date herewith and incorporated herein by reference.

C. Fluorothermoplastics derived from copolymerization of a monomer charge of TFE (preferably from 45 to 70 weight %), HFP (preferably from 10 to 20 weight %) and a formula II monomer, preferably an alpha olefin hydrocarbon ethylenically unsaturated comonomer having from 1 to 3 carbon atoms, such as ethylene or propylene (preferably from 10 to 20 weight %).

D. Fluorothermoplastics derived from TFE and a monomer having the general structure of formula II. Particularly preferred polymers of this subclass are copolymers of TFE and propylene. Such copolymers are most preferably derived by copolymerizing from 50 to 95 wt. %, preferably from 85 to 90 wt. %, of TFE with from 50 to 15 wt. %, preferably from 15 to 10 wt. %, of the Formula II comonomer.

The multimodal fluoropolymers useful in the invention can be prepared in a number of ways. For example, the polymer can be produced by means of a suitable polymerization process ("step polymerization"). This process employs the use of specific initiators and chain transfer agents such as short-chain alkanes and halogen alkanes plus hydrogen. Preferably, the process is carried out in the manner described below. At the beginning of the polymerization, relatively little initiator and relatively little chain transfer agent are charged to the reaction vessel for a desired high melting viscosity. As the polymerization proceeds, additional initiator and chain transfer agent are charged to the reaction vessel. The exact timing and quantity of these charges will effect the polymerization conditions and permit the operator to produce a polymer having the desired characteristics. For example, after 50% of the TFE (or other specified starting monomer) has been added, the further addition of appropriate amounts of initiator and chain transfer agent can be used to change the polymerization conditions and produce a polymer with a desired low melting viscosity. A desired low melting viscosity can also be achieved by increasing the temperature during the polymerization. The advantage of this production method is the fact that a "perfect" mixing of the two components can be created in situ. The technical effort is reduced as a result.

The polymer may also be produced by mixing either the latexes or the powder products of the separate components. Preferably, the polymer is prepared by mixing the latexes of the components (so-called latex blending) and subsequently finishing the mixture as disclosed in U.S. Pat. No. 4,262,101. Alternatively, the mixture may be finished by mechanical precipitation by means of a homogenizer and subsequent treatment with gasoline. After subsequent drying, the product is preferably subjected to a melt granulation. Especially homogenous mixtures are obtained as a result of the latex blending.

A wide variety of polymers are useful as the host polymer in the present invention. Useful host polymers are substantially non-fluorinated polymers that are sometimes referred to as being difficultly melt processable. They include both hydrocarbon and non-hydrocarbon polymers. Examples of useful host polymers include, but are not limited to, polyamides, polyimides, polyurethanes, polyolefins, polystyrenes, polyesters, polycarbonates, polyketones, polyureas, polyvinyl resins, polyacrylates and polymethylacrylates.

A particularly useful class of host polymers are polyolefins. Representative examples of polyolefins useful in the present invention are polyethylene, polypropylene, poly(1-butene), poly(3-methylbutene), poly(4-methylpentene) and copolymers of ethylene with propylene, 1-butene, 1-hexene, 1-octene, 1-decene, 4-methyl-1-pentene, and 1-octadecene.

Representative blends of polyolefins useful in the invention are blends of polyethylene and polypropylene, linear or branched low-density polyethylenes, high-density polyethylenes, and polyethylene and olefin copolymers containing said copolymerizable monomers, some of which are described below, e.g., ethylene and acrylic acid copolymers; ethylene and methyl acrylate copolymers; ethylene and ethyl acrylate copolymers; ethylene and vinyl acetate copolymers; ethylene, acrylic acid, and ethyl acrylate copolymers; and ethylene, acrylic acid, and vinyl acetate copolymers.

The polyolefins may be obtained by the homopolymerization or copolymerization of olefins, as well as copolymers of one or more olefins and up to about 30 weight percent or more, but preferably 20 weight percent or less, of one or more monomers that are copolymerizable with such olefins, e.g. vinyl ester compounds such as vinyl acetate. The olefins may be characterized by the general structure $CH_2=CHR$, wherein R is a hydrogen or an alkyl radical, and generally, the alkyl radical contains not more than 10 carbon atoms, preferably from one to six carbon atoms. Representative olefins are ethylene, propylene, 1-butene, 1-hexene, 4-methyl-1-pentene, and 1-octene. Representative monomers that are copolymerizable with the olefins include: vinyl ester monomers such as vinyl acetate, vinyl propionate, vinyl butyrate, vinyl chloroacetate, and vinyl chloropropionate; acrylic and alpha-alkyl acrylic acid monomers and their alkyl esters, amides, and nitriles such as acrylic acid, methacrylic acid, ethacrylic acid, methyl acrylate, ethyl acrylate, N,N-dimethyl acrylamide, methacrylamide, and acrylonitrile; vinyl aryl monomers such as styrene, o-methoxystyrene, p-methoxystyrene, and vinyl naphthalene; vinyl and vinylidene halidemonomers such as vinyl chloride, vinylidene chloride, and vinylidene bromide; alkyl ester monomers of maleic and fumaric acid and anhydrides thereof such as dimethyl maleate, diethyl maleate, and maleic anhydride; vinyl alkyl ether monomers such as vinyl methyl ether, vinyl ethyl ether, vinyl isobutyl ether, and 2-chloroethyl vinyl ether; vinyl pyridine monomers; N-vinyl carbazole monomers; and N-vinyl pyrolidine monomers.

Useful host polymers also include the metallic salts of the olefin copolymers, or blends thereof, that contain free carboxylic acid groups. Illustrative of the metals that can be used to provide the salts of said carboxylic acids polymers are the one, two, and three valence metals such as sodium, lithium, potassium, calcium, magnesium, aluminum, barium, zinc, zirconium, beryllium, iron, nickel, and cobalt.

Useful host polymers also include blends of various thermoplastic polymers and blends thereof containing conventional adjuvants such as antioxidants, light stabilizers, fillers, antiblocking agents, and pigments.

The host polymers may be used in the form of powders, pellets, granules, or in any other extrudable form. The most preferred olefin polymers useful in the invention are hydrocarbon polymers such as homopolymers of ethylene and propylene or copolymers of ethylene and 1-butene, 1-hexene, 1-octene, 4-methyl-1-pentene, propylene, vinyl acetate and methyl acrylate.

The melt processable composition of the invention can be prepared by any of a variety of ways. For example, the host polymer and the multimodal fluoropolymer processing additive can be combined together by any of the blending means usually employed in the plastics industry, such as with a compounding mill, a Banbury mixer, or a mixing extruder in which the processing additive is uniformly distributed throughout the host polymer. The processing additive and the host polymer may be used in the form, for example, of a powder, a pellet, or a granular product. The mixing operation is most conveniently carried out at a temperature above the melting point or softening point of the fluoropolymer, though it is also feasible to dry-blend the components in the solid state as particulates and then cause uniform distribution of the components by feeding the dry blend to a twin-screw melt extruder.

The resulting melt-blended mixture can be pelletized or otherwise comminuted into a desired particulate size or size distribution and fed to an extruder, which typically will be a single-screw extruder, that melt-processes the blended mixture. Melt-processing typically is performed at a temperature from 180° to 280° C., although optimum operating temperatures are selected depending upon the melting point, melt viscosity, and thermal stability of the blend. Different types of extruders that may be used to extrude the compositions of this invention are described, for example, by Rauwendaal, C., "Polymer Extrusion," Hansen Publishers, p. 23–48, 1986. The die design of an extruder can vary, depending on the desired extrudate to be fabricated. For example, an annular die can be used to extrude tubing, useful in making fuel line hose, such as that described in U.S. Pat. No. 5,284,184 (Noone et al.), which description is incorporated herein by reference.

The blended composition can contain conventional adjuvants such as antioxidants, antiblocks, pigments, and fillers, e.g. titanium dioxide, carbon black, and silica. Antiblocks, when used, may be coated or uncoated materials.

The multimodal fluoropolymer processing additive of this invention may also be combined with a poly(oxyalkylene) polymer component. The poly(oxyalkylene) polymer component may comprise one or more poly(oxyalkylene) polymers. A useful processing additive composition comprises between about 5 and 95 weight percent of the poly(oxyalkylene) polymer component and 95 and 5 weight percent of the fluoropolymer. Typically, the ratio of the fluoropolymer to the poly(oxyalkylene) polymer component in the processing aid will be from 1/2 to 2/1.

The poly(oxyalkylene) polymer component generally may comprise between about 0.005 and 20 weight percent of the overall melt processable composition, more preferably between about 0.01 and 5 weight percent, and most preferably between about 0.02 and 1 weight percent.

Generally, poly(oxyalkylene) polymers useful in this invention include poly(oxyalkylene) polyols and their derivatives. A class of such poly(oxyalkylene) polymers may be represented by the general formula:

$$A[(OR^3)_xOR^2]_y$$

wherein:

A is an active hydrogen-free residue of a low molecular weight, initiator organic compound having a plurality of active hydrogen atoms (e.g., 2 or 3), such as a polyhydroxyalkane or a polyether polyol, e.g., ethylene glycol, glycerol, 1,1,1-trimethylol propane, and poly(oxypropylene) glycol;

y is 2 or 3;

$(OR^3)_x$ is a poly(oxyalkylene) chain having a plurality of oxyalkylene groups, $(OR^3)$, wherein the $R^3$ moieties can be the same or different and are selected from the group consisting of $C_1$ to $C_5$ alkylene radicals and, preferably, $C_2$ or $C_3$ alkylene radicals, and x is the number of oxyalkylene units in said chain. Said poly(oxyalkylene) chain can be a homopolymer chain, e.g., poly(oxyethylene) or poly(oxypropylene), or can be a chain of randomly distributed (i.e., a heteric mixture) oxyalkylene groups, e.g., a copolymer —$OC_2H_4$— and —$OC_3H_6$— units, or can be a chain having alternating blocks or backbone segments of repeating oxyalkylene groups, e.g., a polymer comprising $-(OC_2H_4)_a$ and $-(OC_3H_6)_b$ blocks, wherein a+b=5 to 5000 or higher, and preferably 10 to 500.

$R^2$ is H or an organic radical, such as alkyl, aryl, or a combination thereof such as aralkyl or alkaryl, and may contain oxygen or nitrogen heteroatoms. For example, $R^2$ can be methyl, butyl, phenyl, benzyl, and acyl groups such as acetyl ($CH_3CO$—), benzoyl ($C_6H_5CO$—) and stearyl ($C_{17}H_{35}CO$—).

Representative poly(oxyalkylene) polymer derivatives can include poly(oxyalkylene) polyol derivatives wherein the terminal hydroxy groups have been partly or fully converted to ether derivatives, e.g., methoxy groups, or ester derivatives, e.g., stearate gorups, ($C_{17}H_{35}COO$—). Other useful poly(oxyalkylene) derivatives are polyesters, e.g., prepared from dicarboxylic acids and poly(oxyalkylene) glycols. Preferably, the major proportion of the poly(oxyalkylene) polymer derivative by weight will be the repeating oxyalkylene gorups, ($OR^1$).

The poly(oxyalkylene) polyols and their derivatives can be those which are solid at room temperature and have a molecular weight of at least about 200 and preferably a molecular weight of about 400 to 20,000 or higher. Poly(oxyalkylene) polyols useful in this invention include polyethylene glycols which can be represented by the formula $H(OC_2H_4)_nOH$, where n is about 15 to 3000, such as those sold under the Carbowax trademark, such as Carbowax™ PEG 8000, where n is about 181, and those sold under the trade name Polyox, such as Polyox™ WSR N-10 where n is about 2272.

The following examples are offered to aid in a better understanding of the present invention. These examples are not to be construed as an exhaustive compilation of all embodiments of the present invention and are not to be unnecessarily construed as limiting the scope of this invention.

EXAMPLES 1–10

Multimodal, partially crystalline fluoropolymers were prepared and compared with unimodal, partially crystalline fluoropolymers as process aids for the elimination of melt fracture in blown film extrusions. Four separate trials were run. The polymer process additives, the experimental conditions and the test results are reported below.

The following fluoroplastics were prepared.

| Fluoro-plastic | Nominal Monomer Composition (weight %) | | | | | Peak Melt Temp (° C.) | Melt Flow Index[1] (MFI) (g/10 min) |
|---|---|---|---|---|---|---|---|
| | TFE | HFP | VDF | Ethylene | Propylene | | |
| THVB | 60 | 18 | 22 | — | — | 165 | 10 |
| THVA | 60 | 18 | 22 | — | — | 165 | 130 |
| THVAA | 60 | 18 | 22 | — | — | 165 | >500 |
| HTEB | 62 | 24 | — | 14 | — | 160 | 10 |
| HTEA | 62 | 24 | — | 14 | — | 160 | 90 |
| TFEPB | 85 | — | — | — | 15 | 100 | 14 |
| TFEPA | 85 | — | — | — | 15 | 100 | 478[2] |
| VHFB | — | 80 | 20 | — | — | 110 | 10 |
| VHFA | — | 80 | 20 | — | — | 110 | 300[2] |

[1]MFI measured @ 265° C., 5 kg weight per ASTM D 1238.
[2]Calculated MFI @ 265° C., 5 kg weight The THVB and THVA fluoroplastics were prepared as described in copending application U.S. Ser. No. 09/311,111, filed of even date herewith. The HTEB and HTEA fluoroplastics were prepared as described in DE 44 12 789 A1. The TFEPB and TFEPA fluoroplastics were prepared as described in U.S. Pat. No. 5,710,217.

A series of polymer processing additive compositions were prepared and tested under the following conditions.

| Trial | Thermoplastic Hydrocarbon Polymer | Die Temp (° C.) | Shear Rate (sec⁻¹) | Polymer Process Additive Concentration (ppm) |
|---|---|---|---|---|
| 1 | Butene Linear Low Density Polyethylene (LLDPE)[1] | 187 | 600 | 700 |
| 2 | Octene LLDPE[2] | 211 | 600 | 700 |
| 3 | Butene LLDPE[1] | 211 | 600 | 700 |
| 4 | Metallocene mLLDPE[3] | 210 | 223 | 1000 |

[1]Melt index of 1, density of 0.918.
[2]Melt index of 1, density of 0.920.
[3]Melt index of 1, density of 0.918.

The melt indices of these hydrocarbon polymers were measured at 190° C., 2.16 Kg weight according to ASTM D-1238.

The efficacy of the processing additive composition in improving the extrusion characteristics of the polyolefins was shown with blown film trials. The time required to eliminate melt fracture during blown film extrusion of linear low density polyethylene (LLDPE) was reduced significantly with the use of processing additive composition of the invention.

For the blown film extrusion studies, an appropriate amount of masterbatch pellets were tumble blended with polyethylene to give a desired level of process aid. Experiments were carried out on a 4.44 cm lab-scale blown film line with a 40 mm grooved feed extruder. The blown film line was equipped with a screw having a length/diameter ratio of 24/1, and 18/35/60 mesh screen pack, a 40 mm die with a 2 mm die gap, and a single lip air ring. The extruder temperature profile was adjusted to give the die temperature specified above.

Process aid performance was assessed based on % melt fracture measured in film samples at regular intervals.

The results of the tests are reported in the following table.

| Example | Polymer Process Additive Composition (Weight %/Weight %) | | | Trial 1 | | Trial 2 | | Trial 3 | | Trial 4 | |
|---|---|---|---|---|---|---|---|---|---|---|---|
| | Low MW (A) | High MW (B) | $MFI_A:MFI_B$ | Time (min) | Melt Fract (%) | Time (min) | Melt Fract (%) | Time (min) | Melt Fract (%) | Time (min) | Melt Fract (%) |
| C1 | — | 100% THVB | — | 100 | 2 | 120 | 27 | 120 | 1 | — | — |
| C2 | 100% THVA | — | — | 105 | 1 | — | — | — | — | — | — |
| 1 | 10% THVA | 90% THVB | 13:1 | 65 | 0 | 100 | 0 | — | — | — | — |
| 2 | 35% THVA | 65% THVB | 13:1 | — | — | — | — | 60 | 0 | — | — |
| 3 | 1% THVA | 99% THVB | 13:1 | 85 | 0 | — | — | — | — | — | — |
| 4 | 10% THVAA | 90% THVB | >50:1 | — | — | 60 | 0 | — | — | — | — |
| 5 | 50% THVA | 50% THVB | 13:1 | — | 120 | 0 | — | — | — | — | — |
| 6 | 50% THVAA | 50% THVB | >50:1 | — | — | 120 | 3 | — | — | — | — |
| 7 | 25% THVA 25% THVAA | 50% THVB | * | — | — | 120 | 5 | — | — | — | — |
| C3 | — | 100% HTEB | — | — | — | — | — | 120 | 5 | 120 | 25 |
| 8 | 10% HTEA | 90% HTEB | 9:1 | — | — | — | — | 50 | 0 | — | — |
| 9 | 45% HTEA | 55% HTEB | 9:1 | — | — | — | — | 90 | 0 | — | — |
| C4 | — | 100% TFEPB | — | — | — | — | — | — | 120 | 30 | |
| 10 | 33% TFEPA | 67% TFEPB | 34:1 | — | — | — | — | — | 120 | 0 | |

*$MFI_A:MFI_B$ = 13:1
$MFI_{AA}:MFI_B$ = >50:1

Comparison of the results shows that when unimodal fluoroplastics are used as polymer processing additive, they do not perform as well as similar multimodal fluoroplastics. Example 10 would show the same type of performance as compared to C4 in that it to would perform better than the unimodal fluoroplastic as a processing additive.

EXAMPLE 11

Blown films were prepared using the procedures described in Examples 1–10, trial 3. Five different additive compositions were evaluated for their effect on melt processability of the polyethylene. The first additive composition was a multimodal composition according to the invention. It comprised 35 weight % THVA and 65 weight % THVB ($MFI_A:MFI_B$=13:1). The blend MFI of this multimodal fluoropolymer additive composition was 41. The other additive compositions comprised unimodal fluoroplastic polymers having the same nominal monomer composition as that of THVA. However, the unimodal fluoroplastics had MFI values of 121, 51, 30 and 10, respectively. The time to clear melt fracture for each additive composition is shown in FIG. 1.

Figure 1:
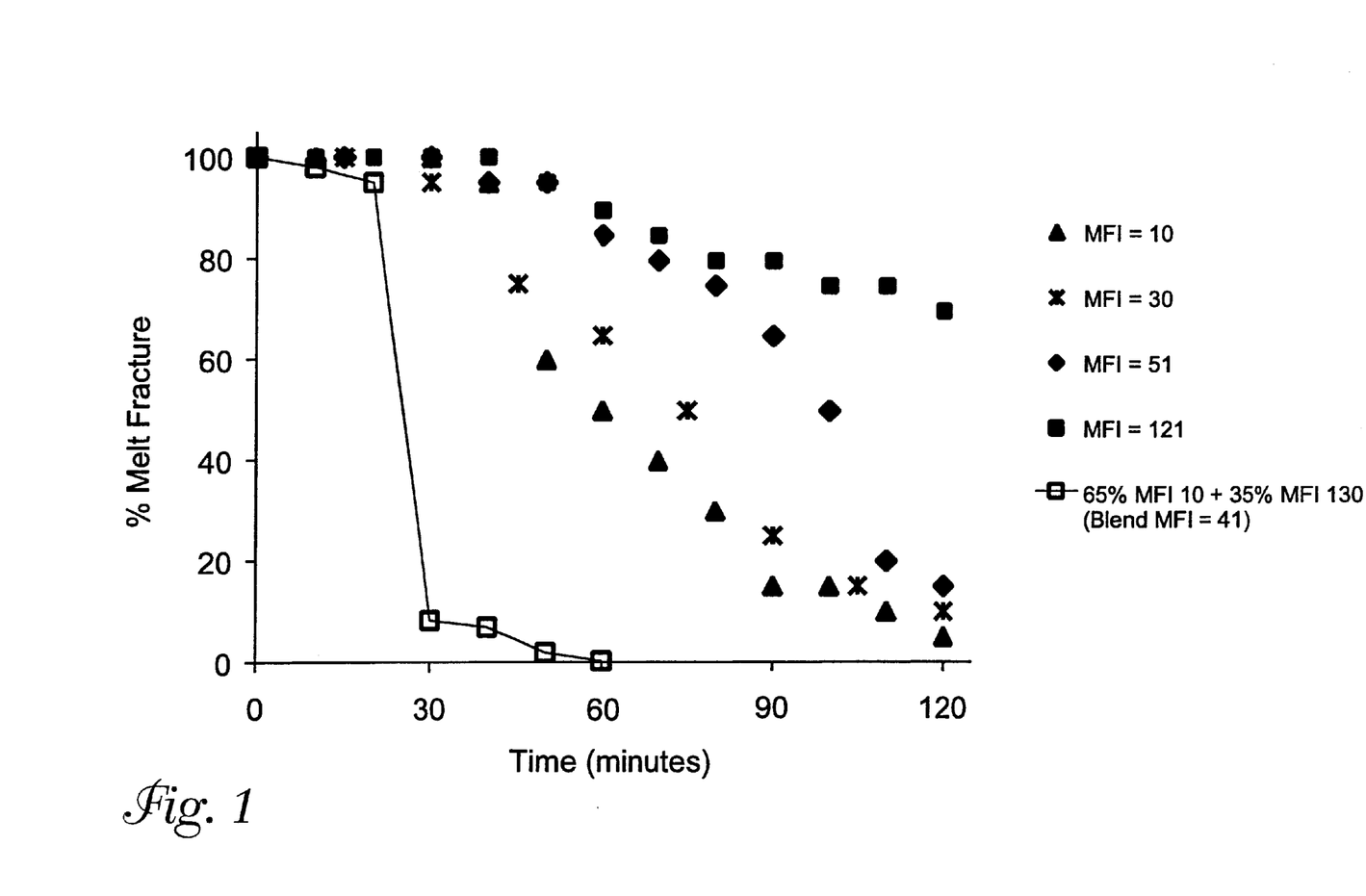
FIG. 1 is a plot showing the time to clear melt fracture for a number of unimodal fluoropolymer processing additives of different melt flow indices and for a multimodal fluoropolymer processing additive according to the invention.

As can be seen from FIG. 1, only the multimodal fluoropolymer-based additive composition cleared melt fracture, accomplishing this after only 60 minutes of extrusion. Even after 120 minutes of processing, none of the unimodal fluoropolymers had cleared the melt fracture. Even though at least two had an MFI very similar to that of the additive composition according to the invention, they did clear melt fracture.

What is claimed is:

1. A processing additive composition comprising a multimodal, fluoropolymer having a Component A with a melt flow index ($MFI_A$) and Component B with a melt flow index ($MFI_B$), wherein the ratio $MFI_A:MFI_B$ is in the range of from 2:1 to 100:1.

2. A processing additive composition according to claim 1 wherein the fluoropolymer is amorphous.

3. A processing additive composition according to claim 1 wherein the fluoropolymer is semicrystalline.

4. A processing additive composition according to claim 1 wherein the $MFI_A:MFI_B$ is in the range of from 5:1 to 50:1.

5. A processing additive composition according to claim 1 wherein the weight ratio of component A to component B (A:B) is in the range of from 1:99 to 99:1.

6. A processing additive composition according to claim 1 wherein $MFI_A$ is greater than 50 and $MFI_B$ is 50 or less.

7. A processing additive composition according to claim 1 wherein the fluoropolymer comprises interpolymerized units derived from at least one monomer of the formula $$RCF=C(R)_2 \qquad (I)$$

wherein each R may be the same or different and is selected from the group of H, F, Cl, alkyl of from 1 to 8 carbon atoms, cyclic alkyl of from 1 to 8 carbon atoms, aryl of from 1 to 10 carbon atoms, and perfluoroalkyl of from 1 to 8 carbon atoms.

8. A processing additive composition according to claim 7 wherein the fluoropolymer comprises interpolymerized units derived from at least one monomer of formula I and at least one monomer having the formula $$(R^1)_2C=C(R^1)_2 \qquad (II)$$

wherein each $R^1$ may be the same or different and is selected from H, Cl or an alkyl group of from 1 to 8 carbon atoms, a cyclic alkyl group of from 1 to 10 carbon atoms, or aryl group of from 1 to 8 carbon atoms.

9. A processing additive composition according to claim 7 wherein the fluoropolymer is derived solely from interpolymerized units of vinylidene fluoride and hexafluoropropylene.

10. A processing additive composition according to claim 9 wherein the fluoropolymer comprises interpolymerized units derived solely from a monomer composition of 99 to 67 weight percent vinylidene fluoride and 1 to 33 weight percent hexafluoropropylene.

11. A processing additive composition according to claim 7 wherein the fluoropolymer comprises interpolymerized units derived from tetrafluoroethylene and more than 5 weight percent of copolymerizable monomer other than tetrafluoroethylene.

12. A processing additive composition according to claim 7 wherein the fluoropolymer comprises interpolymerized units derived from tetrafluoroethylene, hexafluoropropylene and a third comonomer of formula I other than tetrafluoroethylene or hexafluoroproplene.

13. A processing additive composition according to claim 12 wherein the third comonomer is vinylidene fluoride.

14. A processing additive composition according to claim 8 wherein the fluoropolymer comprises interpolymerized units derived from 45 to 70 weight % tetrafluoroethylene, from 10 to 20 weight % hexafluoropropylene and from 10 to 20 weight percent of a formula II monomer.

15. A processing additive composition according to claim 14 wherein the formula II monomer is propylene.

16. A processing additive composition according to claim 8 wherein the fluoropolymer comprises interpolymerized units derived from 50 to 95 weight % tetrafluoroethylene and from 50 to 5 weight % of a formula II monomer.

17. A melt processable polymer composition comprising a major amount of a melt processable thermoplastic host polymer and a minor amount of the processing additive composition according to claim 1.

18. A melt processable composition according to claim 17 wherein the host polymer comprises from about 50 to 99.995 weight % of the composition.

19. A melt processable composition according to claim 17 wherein the host polymer is a polyolefin.

20. A method for reducing melt defects in a melt processable thermoplastic host polymer which comprises the steps of forming a melt processable polymer composition comprising the host polymer and an effective amount of the processing additive composition according to claim 1; mixing the processing additive composition and the host polymer for a time sufficient to blend them together, and melt processing the polymer composition.

21. A method according to claim 20 wherein the melt processable polymer composition comprises from 50 to 98 weight percent of the host polymer and from 50 to 2 weight percent of the processing additive.

22. A method according to claim 21 wherein the melt processable polymer composition comprises from 98 to 99.995 weight percent of the host polymer and from 2 to 0.005 weight percent of the polymer processing additive.

23. A method according to claim 20 wherein the host polymer comprises a polyolefin.

24. A processing additive composition according to claim 1 wherein $MFI_A$ is greater than 100 and $MFI_B$ is 100 or less.

* * * * *

UNITED STATES PATENT AND TRADEMARK OFFICE
CERTIFICATE OF CORRECTION

PATENT NO.    : 6,277,919 B1
DATED         : August 21, 2001
INVENTOR(S)   : Maria P. Dillon, Susan S. Woods, Kirsten J. Fronek, Claude Lavallée, Stephen E. Amos, Karl-Dieter Weilandt, Harald Kaspar, Bernhard Hirsch, Klaus Hintzer and Peter J. Scott It is certified that error appears in the above-identified patent and that said Letters Patent is hereby corrected as shown below:

Column 5,
Line 40, "thereof Perfluoro" should read -- thereof . Perfluoro --
Line 51, "(EFP)" should read -- (HFP) --

Columns 1-12,
Between lines 9-33, in the Table:
Example C2, Trial 3 under Melt Fract (%): insert -- — --
Example C2, Trial 4 under Time (min): insert -- — --
Example C2, Trial 4 under Melt Fract (%): insert -- — --
Example 3, Trial 3 under Time (min): insert: -- — --
Example 3, Trial 3 under Melt Fract (%) insert: -- — --
Example 3, Trial 4 under Time (min) insert: -- — --
Example 3, Trial 4 under Melt Fract (%) insert: -- — --
Example 5, Trial 1 under Melt Fract (%) "120" should read -- — --
Example 5, Trial 2 under Time (min): "0" should read -- 120 --
Example 5, Trial 2 under Melt Fract (%): "—" should read -- 0 --
Example C4, Trial 3 under Melt Fract (%): "120" should read -- — --
Example C4, Trial 4 under Time (min): "30" should read -- 120 --
Example C4, Trial 4 under Melt Fract (%): insert -- 30 --
Example 10, Trial 3 under Melt Fract (%): "120" should read -- — --
Example 10, Trial 4 under Time (min): "0" should read -- 120 --
Example 10, Trial 4 under Melt Fract (%): insert -- 0 --

Signed and Sealed this

Thirteenth Day of August, 2002

*Attest:*

*Attesting Officer*

JAMES E. ROGAN
*Director of the United States Patent and Trademark Office*

(12) EX PARTE REEXAMINATION CERTIFICATE (5672nd)
United States Patent
Dillon et al.

(10) Number: US 6,277,919 C1
(45) Certificate Issued: *Feb. 13, 2007

(54) POLYMER PROCESSING ADDITIVE CONTAINING A MULTIMODAL FLUOROPOLYMER AND MELT PROCESSABLE THERMOPLASTIC POLYMER COMPOSITION EMPLOYING THE SAME

(75) Inventors: Maria P. Dillon, St. Paul, MN (US); Susan S. Woods, Shoreview, MN (US); Kirsten J. Fronek, Woodbury, MN (US); Claude Lavallée, London (CA); Stephen E. Amos, Minneapolis, MN (US); Karl-Dieter Weilandt, Minneapolis, MN (US); Harald Kaspar, Burgkirchen (DE); Bernhard Hirsch, Burgkirchen (DE); Klaus Hintzer, Woodbury, MN (US); Peter J. Scott, Woodbury, MN (US)

(73) Assignee: Dyneon LLC, Oakdale, MN (US)

Reexamination Request:
No. 90/007,310, Nov. 18, 2004

Reexamination Certificate for:
Patent No.: 6,277,919
Issued: Aug. 21, 2001
Appl. No.: 09/311,107
Filed: May 13, 1999

(*) Notice: This patent is subject to a terminal disclaimer.

Certificate of Correction issued Aug. 13, 2002.

(51) Int. Cl.
*C08L 27/12* (2006.01)
*C08L 27/14* (2006.01)
*C08L 27/16* (2006.01)
*C08L 27/18* (2006.01)
*C08L 27/20* (2006.01)

(52) U.S. Cl. .................. 525/199; 525/239; 525/240
(58) Field of Classification Search .................. None
See application file for complete search history.

(56) References Cited

U.S. PATENT DOCUMENTS

| | | | | |
|---|---|---|---|---|
| 3,125,547 A | * | 3/1964 | Blatz .................. | 525/199 |
| 5,218,026 A | | 6/1993 | Toda et al. | |
| 5,955,556 A | * | 9/1999 | McCarthy et al. .......... | 526/249 |
| 6,277,919 B1 | * | 8/2001 | Dillon et al. .............. | 525/199 |
| 6,696,526 B1 | * | 2/2004 | Kaulbach et al. ........... | 525/200 |

FOREIGN PATENT DOCUMENTS

EP         0 362 868 B1 *  2/1995

OTHER PUBLICATIONS

Clerk Docket No. 120 Memorandum in Support re Clerk Docket No. 118 Motion for Summary Judgment on Defendant's Anticipation and Indefiniteness Defenses Only. (Redacted Version).

Clerk Docket No. 121 Memorandum in Support of Clerk Docket No. 118 Motion for Summary Judgment for Plaintiffs' Motion for Summary Judgment on Defendant's Affirmative Defense and Counterclaim Alleging Inequitable Conduct Only. (Originally Filed Under Seal and Now No Longer Designated as Restricted Confidential).

Clerk Docket No. 124 Motion for Summary Judgment by Dupont Dow Elastomers LLC. (Redacted Version).

Clerk Docket No. 129 Memorandum in Opposition re Clerk Docket No. 118 Motion for Summary Judgment on Defendant's Anticipation and Indefiniteness Defenses and Plaintiffs' Motion for Summary Judgment on Defendant's Affirmative Defense and Counterclaim Alleging Inequitable Conduct filed by Dupont Dow Elastomers LLC. (Redacted Version).

Clerk Docket No. 130 Memorandum in Opposition re Clerk Docket No. 118 Motion for Summary Judgment on Defendant's Anticipation and Indefiniteness Defenses and Plaintiffs' Motion for Summary Judgment on Defendant's Affirmative Defense and Counterclaim Alleging Inequitable Conduct filed by Dupont Dow Elastomers LLC. (Originally Filed Under Seal and Now No Longer Designated as Restricted Confidential).

Clerk Docket No. 133 Memorandum in Opposition re Clerk Docket No. 124 Motion for Summary Judgment filed by 3M Innovative Properties Company, Dyneon LLC. (Redacted Version).

Clerk Docket No. 139 REPLY Memorandum in Support of Clerk Docket No. 118 Motion for Summary Judgment on Defendant's Affirmative Defense and Counterclaim Alleging Inequitable Conduct filed by 3M Innovative Properties Company, Dyneon LLC. (Originally Filed Under Seal and Now No Longer Designated as Restricted Confidential).

Clerk Docket No. 140 REPLY Memorandum in Support of Clerk Docket No. 118 Motion for Summary Judgment on Defendant's Anticipation and Indefiniteness Defenses filed by 3M Innovative Properties Company, Dyneon LLC. (Originally Filed Under Seal and Now No Longer Designated as Restricted Confidential).

Clerk Docket No. 143 Response in Support re Clerk Docket No. 124 Motion for Summary Judgment on Noninfringment and Patent Invalidity filed by Dupont Dow Elastomers LLC. (Redacted Version).

(Continued)

*Primary Examiner*—Jerry D. Johnson (57) ABSTRACT

A polymer processing aid composition, a melt processable polymer composition that uses the polymer processing aid, and a method of improving the melt processability of a thermoplastic polymer are provided. The polymer processing aid composition comprises a multimodal fluoropolymer that preferably comprises interpolymerized units derived from an ethylenically unsaturated fluoromonomer tetrafluoroethylene and at least one ethylenically copolymerizable alpha-olefin monomer.

OTHER PUBLICATIONS

Clerk Docket No. 159 Order that 1) Plaintiff's Motion for Summary Judgment on Defendant's Anticipation and Indefiniteness Defenses (Clerk Doc. No. 118) is Granted; 2) Defendant's Motion for Summary Judgment of Noninfringement and Patent Invalidity (Clerk Doc. No. 124) is Denied; and 3) Plaintiffs' Motion for Summary Judgment on Defendant's Affirmative Defense and Couterclaim Alleging Inequitable Conduct (Clerk Doc. No. 118) is Denied. (Redacted Version).

Clerk Docket No. 181 Memorandum in Support re Clerk Docket No. 179 Motion for Summary Judgment (Renewed) on Defendant's Inequitable Conduct Defense and, in the Alternative, a Bench Trial on the Issue of Inequitable Conduct filed by 3M Innovative Properties Company, Dyneon LLC.

Clerk Docket No. 186 Memorandum in Opposition re Clerk Docket No. 179 Motion for Summary Judgment (Renewed) on Defendant's Inequitable Conduct Defense and, in the Alternative, a Bench Trial on the Issue of Inequitable Conduct filed by Dupont Dow Elastomers LLC. (Redacted Version).

Clerk Docket No. 192 Memorandum in Support re Clerk Docket No. 179 Motion for Summary Judgment (Renewed) on Defendant's Inequitable Conduct Defense and, in the Alternative, a Bench Trial on the Issue of Inequitable Conduct (Reply and Counterclaim) filed by 3M Innovative Properties Company, Dyneon LLC. (Redacted Version).

Clerk Docket No. 228 ORDER granting in part and denying in part Clerk Docket No. 161 Motion claim construction, granting Clerk Docket No. 166 Defendant's Motion for Summary Judgment, denying Plaintiff's179 Motion for Summary Judgment. (Redacted Version).

Motion for Reconsideration/Clarification of Court's Summary Judgment Order dated Sep. 25, 2004 (Motion dated Oct. 5, 2004).

Court Order denying Motion (Oct. 6, 2004).

EP Patent No. 1183308 file wrapper, 199 pages.

EP Patent Application No. 05076373.9 file wrapper, 70 pages.

United States District Court, District of Minnesota; *3M Innovative Properties Company and Dyneon LLC,* v. *DuPont Dow Elastomers LLC;* Pleadings Index, 32 pages.

"Excerpt of Videotaped Deposition of James V. Lilly Taken on Jun. 23, 2004" pp. 1–8 containing identifying information, relevant pp. 77–80, and last page containing certification.

*Encyclopedia of Polymer Science and Engineering,* vol. 6, p. 477, Wiley–Interscience Publication, John Wiley & Sons, New York, 1986.

* cited by examiner

US 6,277,919 C1

1
EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–17, 20 and 24 are determined to be patentable as amended.

Claims 18–19 and 21–23, dependent on an amended claim, are determined to be patentable.

New claims 25–27 are added and determined to be patentable.

1. A processing additive composition comprising a multimodal[,] fluoropolymer having a Component A with a melt flow index ($MFI_A$) and Component B with a melt flow index ($MFI_B$), wherein the ratio $MFI_A:MFI_B$ is in the range of from 2:1 to 100:1, *in combination with a host polymer*.

2. A processing additive composition *in combination with a host polymer* according to claim 1 wherein the fluoropolymer is amorphous.

3. A processing additive composition *in combination with a host polymer* according to claim 1 wherein the fluoropolymer is semicrystalline.

4. A processing additive composition *in combination with a host polymer* according to claim 1 wherein the $MFI_A:MFI_B$ is in the range of from 5:1 to 50:1.

5. A processing additive composition *in combination with a host polymer* according to claim 1 wherein the weight ratio of component A to component B (A:B) is in the range of from 1:99 to 99:1.

6. A processing additive composition *in combination with a host polymer* according to claim 1 wherein $MFI_A$ is greater than 50 and $MFI_B$ is 50 or less.

7. A processing additive composition *in combination with a host polymer* according to claim 1 wherein the fluoropolymer comprises interpolymerized units derived from at least one monomer of the formula $$RCF=C(R)_2 \quad (I)$$

wherein each R may be the same or different and is selected from the group of H, F, Cl, alkyl of from 1 to 8 carbon atoms, cyclic alkyl of from 1 to 8 carbon atoms, aryl of from 1 to 10 carbon atoms, and perfluoroalkyl of from 1 to 8 carbon atoms.

8. A processing additive composition *in combination with a host polymer* according to claim 7 wherein the fluoropolymer comprises interpolymerized units derived from at least 2
one monomer of formula I and at least one monomer having the formula $$(R^1)_2C=C(R^1)_2 \quad (II)$$

wherein each $R^1$ may be the same or different and is selected from H, Cl or an alkyl group of from 1 to 8 carbon atoms, a cyclic alkyl group of from 1 to 10 carbon atoms, or aryl group of from 1 to 8 carbon atoms.

9. A processing additive composition *in combination with a host polymer* according to claim 7 wherein the fluoropolymer is derived solely from interpolymerized units of vinylidene fluoride and hexafluoropropylene.

10. A processing additive composition *in combination with a host polymer* according to claim 9 wherein the fluoropolymer comprises interpolymerized units derived solely from a monomer composition of 99 to 67 weight percent vinylidene fluoride and 1 to 33 weight percent hexafluoropropylene.

11. A processing additive composition *in combination with a host polymer* according to claim 7 wherein the fluoropolymer comprises interpolymerized units derived from tetrafluoroethylene and more than 5 weight percent of copolymerizable monomer other than tetrafluoroethylene.

12. A processing additive composition *in combination with a host polymer* according to claim 7 wherein the fluoropolymer comprises interpolymerized units derived from tetrafluoroethylene, hexafluoropropylene and a third comonomer of formula I other than tetrafluoroethylene or hexafluoroproplene.

13. A processing additive composition *in combination with a host polymer* according to claim 12 wherein the third comonomer is vinylidene fluoride.

14. A processing additive composition *in combination with a host polymer* according to claim 8 wherein the fluoropolymer comprises interpolymerized units derived from 45 to 70 weight % tetrafluoroethylene, from 10 to 20 weight % hexafluoropropylene and from 10 to 20 weight percent of a formula II monomer.

15. A processing additive composition *in combination with a host polymer* according to claim 14 wherein the formula II monomer is propylene.

16. A processing additive composition *in combination with a host polymer* according to claim 8 wherein the fluoropolymer comprises interpolymerized units derived from 50 to 95 weight % tetrafluoroethylene and from 50 to 5 weight % of a formula II monomer.

17. A melt processable polymer composition comprising a major amount of a melt processable thermoplastic host polymer and a minor amount of [the] *a* processing additive composition [according to claim 1] *comprising a multimodal fluoropolymer having a Component A with a melt flow index ($MFI_A$) and Component B with a melt flow index ($MFI_B$), wherein the ratio $MFI_A:MFI_B$ is in the range of from 2:1 to 100:1*.

20. A method for reducing melt defects in a melt processable thermoplastic host polymer which comprises the steps of forming a melt processable polymer composition comprising the host polymer and an effective amount of [the] *a* processing additive composition [according to claim 1] *comprising a multimodal, fluoropolymer having a Component A with a melt flow index ($MFI_A$) and Component B with a melt flow index ($MFI_B$), wherein the ratio $MFI_A:MFI_B$ is in the range of from 2:1 to 100:1*; mixing the processing additive composition and the host polymer for a time sufficient to blend them together, and melt processing the polymer composition.

24. A processing additive composition *in combination with a host polymer* according to claim 1 wherein $MFI_A$ is greater than 100 and $MFI_B$ is 100 or less.

*25. The processing additive composition in combination with a host polymer according to claim 1, wherein the processing additive composition includes a poly(oxyalkylene) polymer component.*

*26. The melt processable polymer composition of claim 17, wherein the processing additive composition includes a poly(oxyalkylene) polymer component.*

*27. The method of claim 20, wherein the processing additive composition includes a poly(oxyalkylene) polymer component.*

* * * * *